United States Patent [19]

Povejsil

[11] 4,092,876

[45] June 6, 1978

[54] THROTTLE CONTROL SLIDER

[75] Inventor: James Harrie Povejsil, Willoughby, Ohio

[73] Assignee: Towmotor Corporation, Mentor, Ohio

[21] Appl. No.: 766,101

[22] Filed: Feb. 7, 1977

[51] Int. Cl.² .................. G05G 9/00; B60K 41/00
[52] U.S. Cl. ......................... 74/478; 74/474; 74/877; 192/0.096
[58] Field of Search .............. 74/560, 561, 562, 562.5, 74/563, 512, 513, 514, 478, 478.5, 474, 877, 879; 192/0.098, 0.096

[56] References Cited

U.S. PATENT DOCUMENTS

| 2,097,391 | 10/1937 | Fageol | 180/77 R X |
| 2,730,214 | 1/1956 | Scott | 74/560 X |
| 3,691,863 | 9/1972 | Shaffer | 192/0.098 X |
| 3,995,510 | 12/1976 | Yost | 74/560 X |

Primary Examiner—Samuel Scott
Assistant Examiner—Don E. Ferrell
Attorney, Agent, or Firm—Phillips, Moore, Weissenberger, Lempio & Majestic

[57] ABSTRACT

A control linkage system is disclosed for simultaneous control of an engine throttle or governor and a hydrostatic transmission from a single control pedal. The system includes unidirectional linkage means including a pair of lost motion links mounted for reciprocal movement at opposed ends of a lever rotatable in either direction by the single pedal. The lost motion links extend outwardly in the same general direction and are coupled at a common pin with the throttle control linkage through a rocker arm. Each lost motion linkage is retractable upon motion of the linkage system in one direction. A second bidirectional linkage means, including an override link, is interconnected to the pedal and a swash plate control member of the hydrostatic transmission.

8 Claims, 7 Drawing Figures

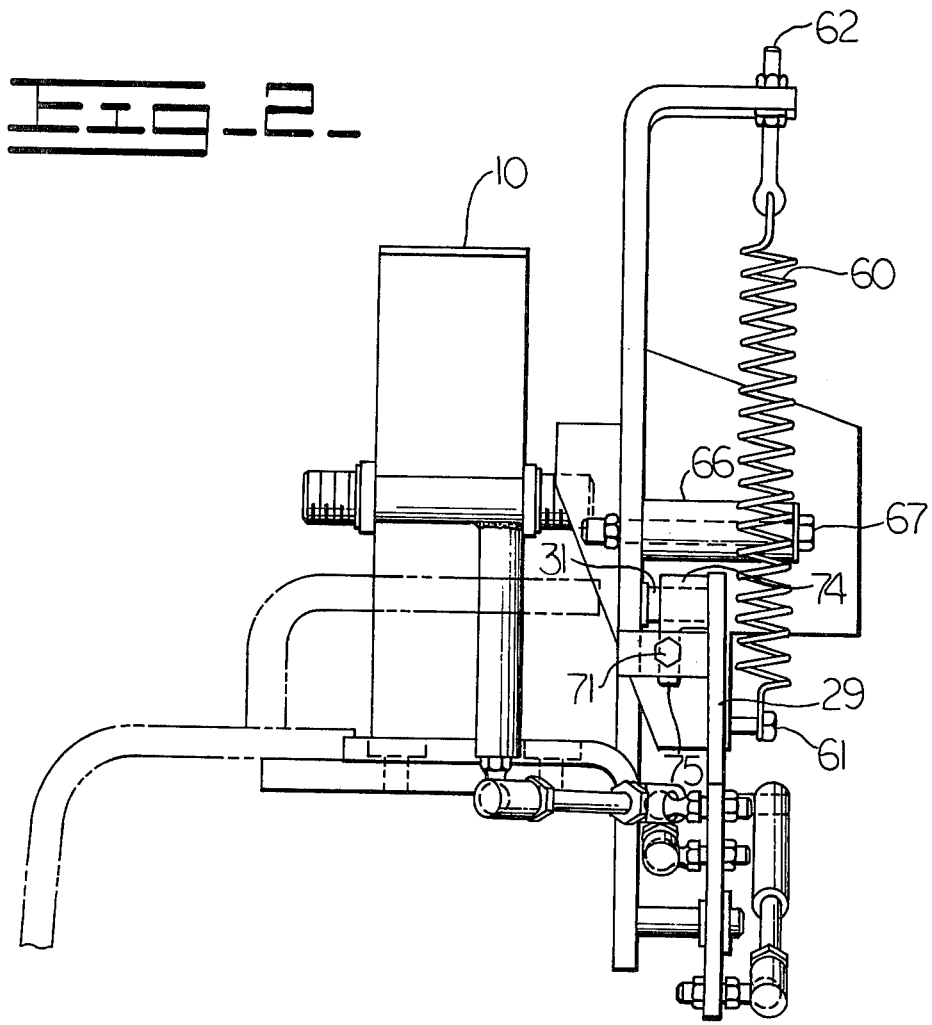
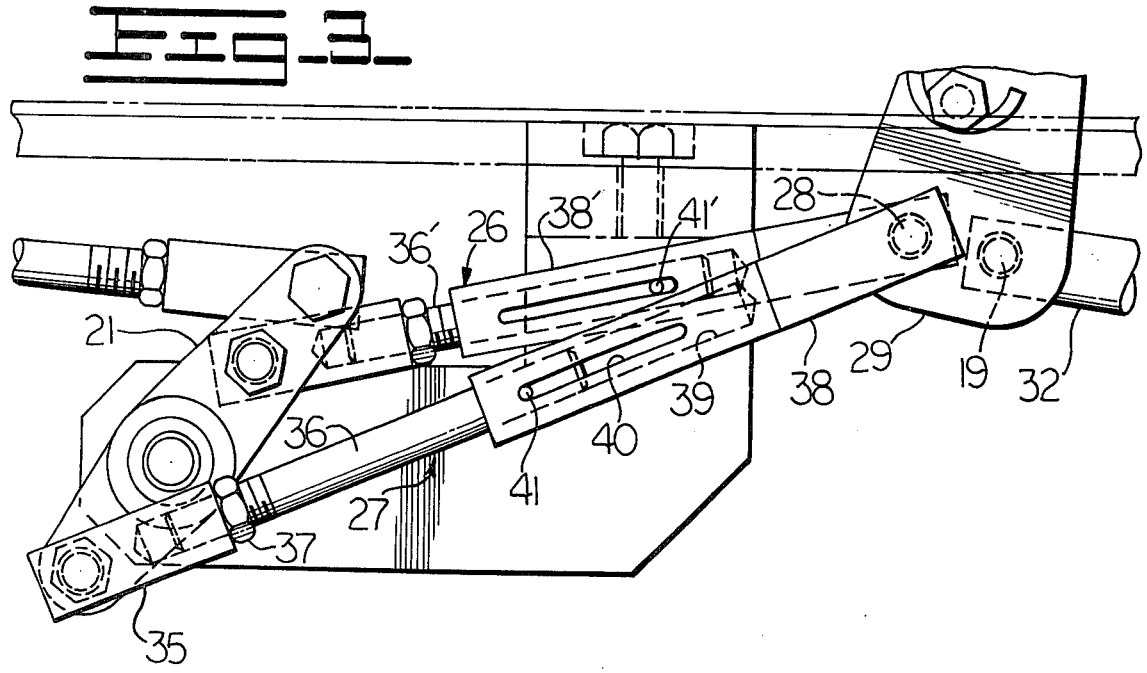

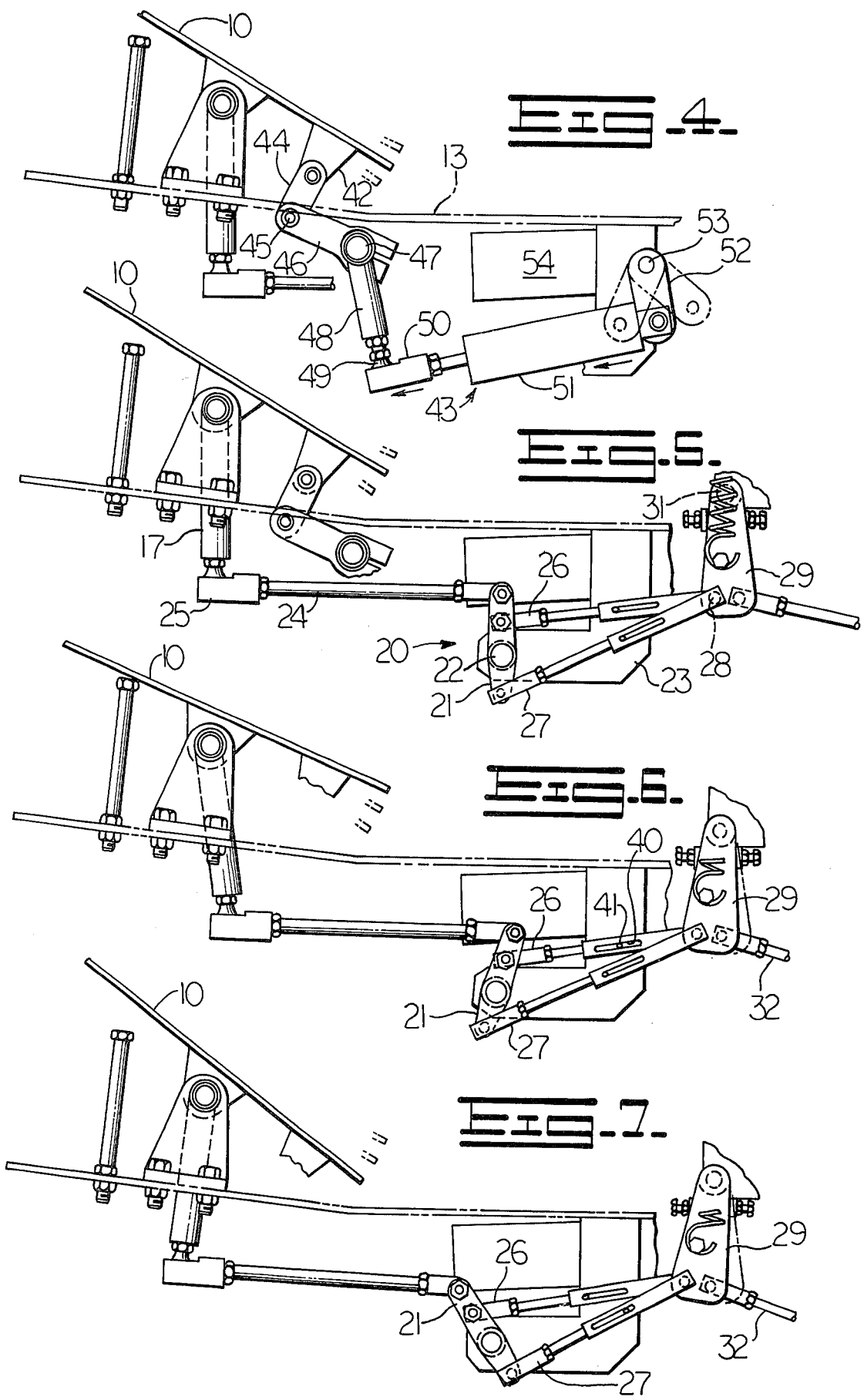

THROTTLE CONTROL SLIDER

BACKGROUND OF THE INVENTION

The present invention relates to a control system and pertains particularly to linkage means for simultaneous control of the engine and transmission of a lift truck or the like from a common foot pedal.

Lift trucks and other similar article handling vehicles normally require that an operator be able to manipulate the vehicle at the same time he is manipulating the article handling implements. The controls of such vehicles are normally arranged such that the steering of the vehicle and the manipulation of the article handling means is controlled by the operator's hands. With such arrangements, it is necessary that the operator be able to control both direction and speed of the vehicle with his feet. It is particularly desirable that the direction and speed of the vehicle be controlled with a single foot to free the other foot for use in operating other necessary pedal actuated devices such as brakes and the like.

Although other systems have been proposed in prior art for control of such vehicles, such proposed prior art systems suffer from one or several disabilities. In particular, control of an engine governor usually involves springing means to return the engine governor to a neutral position. Although some systems have incorporated balancing means to overcome the force imposed on the operator's foot pedal by the governor return spring, such systems have required extensive bell cranks and linkage arrangements and the like. Other systems proposing various other schemes to achieve the required motion, have failed to incorporate the balance means in the linkage.

SUMMARY AND OBJECTS OF THE INVENTION

It is therefore a primary object of the present invention to provide a control arrangement for simultaneous and convenient control of the speed and direction of a vehicle with a single foot pedal.

Another object of the present invention is to provide a vehicle control arrangement that is simple and effective while providing simultaneous operation of the vehicle speed and direction by rocking the aforedescribed foot pedal.

A still further object of the present invention is to provide a control arrangement for a hydrostatic driven vehicle where throttle and directional control of the vehicle may be accomplished simultaneously through rocking movement of a single foot pedal in alternate directions about a central pivot point.

A further object of this invention is to provide the control arrangement which fulfills the above objects and further incorporates a balance means in the speed or throttle linkage to maintain a relatively steady pedal pressure in opposition to the operator's foot pressure.

In accordance with the aforedescribed objects of the present invention, an operator responsive pedal movable in first and second directions about a pivot point is connected through first linkage means to a shaft rotatably mounted in the vehicle frame. The shaft is movable responsive to the first linkage means in directions corresponding relatively to the rocking motion of the pedal member. A second linkage means is interconnected with control rod means to provide unidirectional motion to the control rod means relative the frame upon motion of the operator pedal member in either the first or second direction from the neutral position. The second link means comprises an elongated lever mounted for rotation generally at its center on the frame and movable in first and second directions responsive to movement of the pedal member, first and second lost motion links coupled with the elongated lever each on opposite sides of the mounting thereof and extending outwardly in the same general direction, and coupling means for associating the lost motion links with the control rod.

BRIEF DESCRIPTION OF THE DRAWINGS

The above objects and other objects and advantages of the present invention will become apparent from the following description and the accompanying drawings, wherein:

FIG. 2 is an end elevation view of the control arrangement shown in FIG. 1 with the directional control linkage removed for clarity.

FIG. 3 is a detailed side elevation view of the lost motion linkage in the speed or throttle control linkage.

FIG. 4 is a portion of the side elevation view shown in FIG. 1 with a portion of the speed control linkage removed for clarity.

FIG. 5 is a side elevation view of the linkage shown in FIG. 1 with portions of the directional control linkage removed.

FIG. 6 is the same linkage shown in FIG. 5 with the pedal in the full forward position.

FIG. 7 is the same linkage shown in FIG. 5 with the pedal end linkage in the full reverse position.

DETAILED DESCRIPTION OF THE PREFERRED EMBODIMENT

Figure 1:
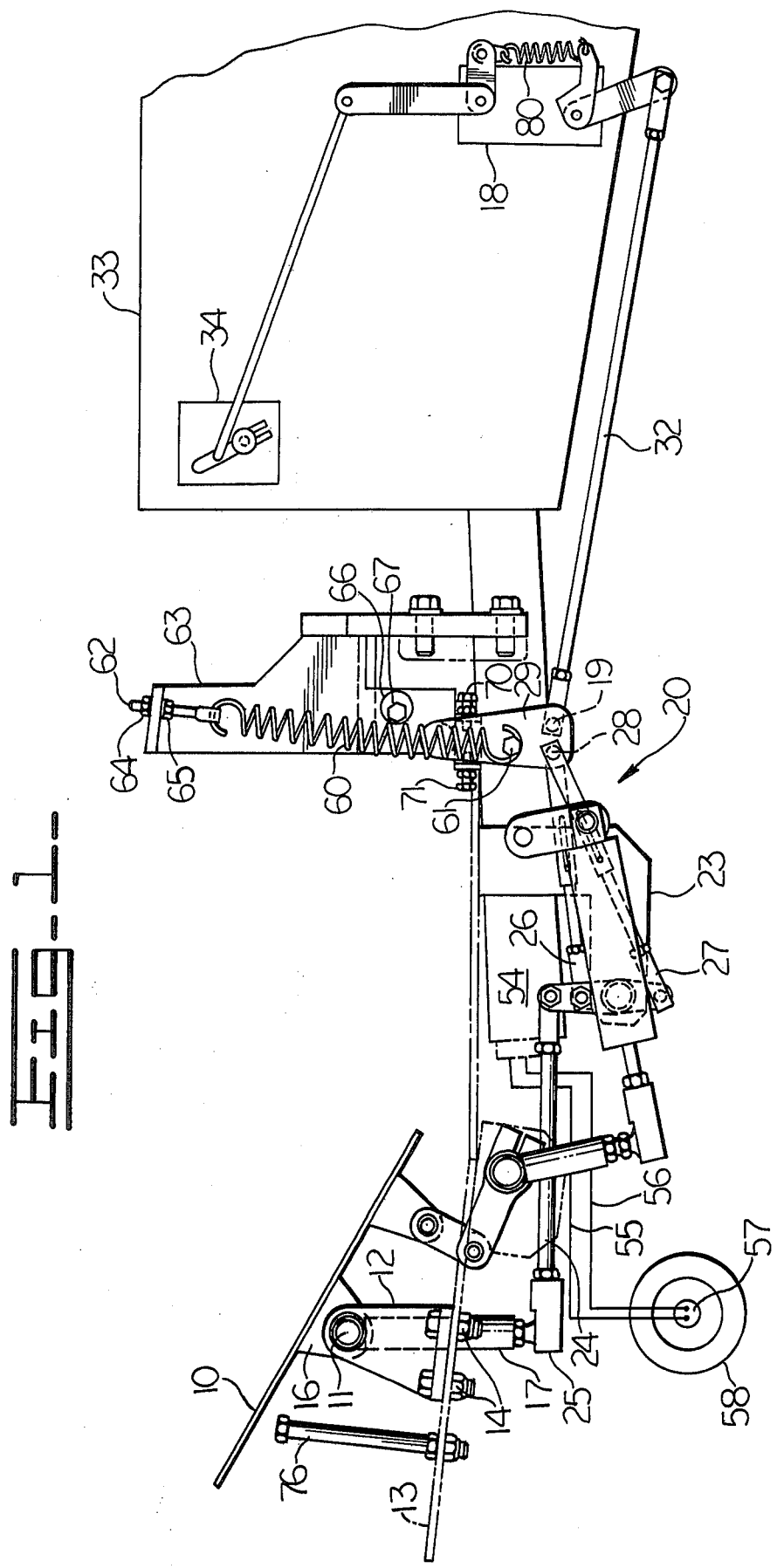
FIG. 1 is an elevation view of a control arrangement in accordance with the preferred embodiment of this invention shown in relation to schematic representations of vehicle components.

Referring to FIG. 1, there is shown a linkage in accord with the preferred embodiment relation to portions of a vehicle, some of which are represented schematically. This invention is particularly adaptable to hydrostatically driven lift trucks wherein a variable displacement pump in a transmission driven by a vehicle engine provides fluid to a motor drivingly connected to the vehicle wheels. Displacement of the variable displacement pump to cause fluid to flow in one direction drives the vehicle in a forward direction while displacement of the variable displacement pump to cause fluid to flow in the other opposite direction propels the vehicle in the reverse direction. Displacement of the variable displacement pump is accomplished simultaneously with increasing of the engine speed up to a maximum displacement of the pump. An increase of the engine speed may be continued beyond this maximum displacement point wherein the volume of fluid communicated to the hydraulic motor is increased in direct proportion to the increased engine speed. It will be apparent to those skilled in the art that in an engine driven variable displacement pump, movement of the swash plate or other adjustment means in the variable displacement pump from the zero displacement position determines the direction of the output motor.

The linkage system shown in FIG. 1 comprises an operator control member such as a rocker type pedal 10 mounted for rocking movement about the axis of a pivot such as pin 11 extending through a bracket 12 fixedly associated with a portion of the vehicle frame 13 by a plurality of bolts 14. Pedal 10 is rotatably affixed to pin 11 at approximately the midpoint of the pedal by subtending bracket 16 so that an operator's foot placed on pedal 10 may rock the pedal in a first or counterclockwise direction as shown in FIG. 1, or a second or clockwise direction.

The bracket 16 affixed to the underside of pedal 10 and through which pin 11 passes, to pivotally locate pedal 10 in relation to bracket 12, has extending downwardly an arm 17. Arm 17 by a swivel joint 25 and an adjustable arm 24, connects pedal 10 to a unidirectional linkage 20 (see FIG. 5) for operating an engine governor 18.

Unidirectional linkage 20 is comprised of an elongate rocker arm 21, affixed generally at its midpoint by a pin 22 to a fixed portion 23 of frame 13. Adjustable arm 24 which is connected to arm 17 by a universal type joint 25, extends outwardly generally perpendicular to arm 17 and is connected at the other end to one end of rocker arm 21 so that movement of pedal 10 in a rocking motion translates the rocking motion to rocker arm 21. Affixed to rocker arm 21 on either side of pin 22 are lost motion links 26 and 27 which extend outwardly in the same general direction and which are connected at their opposite ends by means of a common pin 28 to a plate member 29. Plate member 29 is affixed for pendular motion to a portion 30 of frame 13 by a pin 31 which allows plate member 29 to move responsive to motion transmitted from rocker arm 21 by the lost motion links 26 and 27.

Plate member 29 has affixed thereto in the vicinity of pin 28 a control rod 32 by a pin 19, control rod 32 may be operatively connected to a governor 18 of an engine 33, both the governor and engine being shown schematically in FIG. 1. Governor 18, through appropriate linkage, controls fuel flow to engine 33 by a carburetor 34. Resilient means including helical spring 80 are included in the linkage of carburetor 34 and governor 18 to bias the control rod 32 rightwardly as shown in FIG. 1. This rightward position of control rod 32 corresponds to an engine idle condition. Thus, to increase engine speed control rod 32 must be urged leftwardly.

Referring now to FIGS. 3 and 6, lost motion link 26 and lost motion link 27 are shown with control rod 32 pulled leftwardly to the high idle setting. It will be noted that rocker arm 21 has been rotated clockwise by counterclockwise rotation of pedal 10, and the corresponding motion in arms 17 and 24. Lost motion link 26 is shown in FIGS. 3 and 6 in the compressed state while lost motion link 27 is shown in the extended state. It will be seen that both link 26 and link 27 are identical structures. Thus, it is appropriate only to describe the structure of one link, in particular link 27. Link 27 is formed with a first portion 35 pivotally connected to rocker arm 21 and an adjustable center portion 36 affixed to first portion 35 by appropriate means which could include a nut 37 utilized to adjust the length of center portion 36 extending outwardly from first portion 35. A third portion 38 is affixed to plate member 29 by pin 28. Third portion 38 defines an axially extending bore 39 adapted to receive center portion 36. An axial slot 40 communicates bore 39 outwardly of third portion 38 so that a pin 41 affixed to center portion 36 and slidable in slot 40 limits travel of center portion 36 inwardly and outwardly of bore 39.

Referring now to FIGS. 5, 6 and 7 for an understanding of the operation of the unidirectional linkage 20, it can be seen that FIG. 5 corresponds to the positioning in FIG. 1, that is, the neutral or low idle setting of the engine. Rotation of pedal 10 is a counterclockwise direction is illustrated in FIG. 6 wherein the motion of the pedal is reflected in a clockwise rotation of rocker arm 21. It can be seen that lost motion link 27 pulls plate member 29 in a clockwise direction thus pulling the control rod 32 in a leftward direction. Simultaneously lost motion link 26 is compressed with pin 41' and center portion 36' sliding rightwardly into third portion 38' of lost motion link 26. Upon movement of pedal 10 back to the neutral position as indicated in FIG. 5, the resilient biasing of the linkage in the governor 18 and the carburetor 34 urges control rod 32 to the right as indicated in FIGS. 1 and 5 and returns rocker arm 21 to the neutral position while extending link 26. Referring now to FIG. 7, pedal 10 has been moved in a clockwise direction rotating arm 21 in a counterclockwise direction, thus pulling lost motion link 26 leftwardly along with plate 29 and control rod 32 while lost motion link 27 is retracted in the manner described above. Thus, it can be seen that rocking motion of pedal 10 from a neutral position as indicated in FIG. 5 in either a first or a second direction will urge control rod 32 in the same direction (leftwardly as illustrated in FIGS. 5, 6 and 7). The term "lost motion link" is used to describe a link which transmits torque from one link to another by pulling the other link when the one link is rotated in a first direction about an axis, but which collapses into itself upon rotation of the one link in the other or second direction.

Affixed at one end of pedal 10 is a second subtending bracket 42 operatively connected to a bidirectional linkage means 43 (see FIG. 4). Bidirectional linkage means 43 controls the transmission of the vehicle. This transmission linkage means in addition to the bracket 42 secured to the underside of pedal 10 includes a link 44 pivotally connected to the end of bracket 42 and at its lower end by way of a pin 45 to an arm 46. Arm 46 is connected to one end of a shaft 47 which is fixedly mounted relative to frame 13. Shaft 47 has fixed at one end an arm 48 rotatable therewith.

The arm 48 is connected by suitable linkage means comprising a swivel joint 49 threadably secured to the end of a rod member 50 and extending into a cylinder member 51 defining a resiliently biased override link member. The opposite end of cylinder member 51 is connected to an arm 52 which is connected to a shaft 53 extending into a transmission 54 (shown schematically in FIG. 4) for controlling the adjustment member of a variable displacement pump such as a swash plate in a hydrostatic transmission. The shaft 53, by way of linkage (not shown), controls transmission control valve means via hydraulic fluid resulting in swash plate control. The override link permits the accelerator pedal 10 to be advanced further in either direction when the arm 52 has reached the end of its movement. The override movement permits additional throttle linkage advancement when the transmission is at full displacement which normally occurs when the engine is at approximately 50 percent of speed. The term "override link" as used in relation to bidirectional linkage 43 means a link which is deliberately constructed to permit one end to move relative the other end after a predetermined amount of force has been applied thereto.

The hydrostatic transmission 54 shown schematically in FIGS. 1 and 4 is of the type normally employed in lift truck type vehicles and includes a hydraulic pump and a motor combination, with one of the devices, such as the pump, having a variable displacement capability as by swiveling a swash plate from a neutral or zero displacement condition in either direction for achieving forward or reverse direction of the vehicle. Referring again to FIG. 1, hydraulic fluid is communicated from the variable displacement pump in transmission 54 through appropriate conduits 55 and 56 to operate a motor 57 which may be mounted coincident with the vehicle wheels represented at 58.

In view of the resilient biasing of push rod 32 operating governor 18, it is normally necessary to apply increasing pressures to pedal 10 to increase vehicle speed. The present linkage includes a balancing system in the governor linkage. The balance mechanism comprises suitable opposing force means including a spring 60 of the tension type connected at one end by a pin 60 affixed to plate member 29. The spring 60 is connected at its opposite end by means of a suitable adjusting means such as an eye bolt 62 extending through a bracket 63 which is secured in a stationery manner to a suitable portion of the vehicle frame 13. A pair of jam nuts 64 and 65 serve to adjust the eye bolt 62 along its length and adjust the tension in spring 60.

The spring 60 is biased by the fixed cam member 66 which is secured in place and adjustable in its angular position by means of a bolt 67 or the like.

It will be seen that the spring acts proportionally to pedal travel on plate 29 in opposition to the opposing force acting on plate 29 previously mentioned in relation to governor 18. It will be appreciated that the position of the fixed cam member 66 and the pivot axis of plate 29 along with the positioning 66 will determine the effective moment or torque acting to rotate plate 29. Thus, the direction of action of the spring 60 on pin 61 can be varied by means of rotation of cam 66.

Travel of plate member 29 is limited in either direction by adjustable stop means. Such adjustable stop means include a first stop bolt 70 and a second stop bolt 71 affixed to projecting bracket 63 and facing a downwardly extending portion of the mounting hub 74 of plate 29. The mounting hub 74 of plate 29 is pivotally located on pin 31. Thus, movement of plate 29 in a clockwise direction as shown in FIG. 1 causes downwardly extending projection 75 to contact stop means 71 while movement in a counterclockwise direction causes the projection 75 to contact the extension 70.

Finally, a bolt like stop means 76 is provided to limit counterclockwise travel of pedal 10.

Operation of the linkage assembly just described should be apparent to those skilled in the art. However, a brief review of such operation is included herewith. Operator control of the vehicle transmission and engine speed is provided through pedal 10 operating a bidirectional linkage 43 and a unidirectional linkage 20 respectively. Rotation of pedal 10 in a clockwise direction as shown in FIG. 7 causes counterclockwise rotation of arm 21 which pulls plate 20 leftwardly as shown in FIG. 6, thus pulling control rod 32 leftwardly which is connected directly to governor 18 controlling the speed of engine 33. Referring to FIG. 4, such clockwise rotation of pedal 10 causes counterclockwise rotation of shaft 47 pushing link 50 rightwardly as shown. Initially, arm 52 follows directly due to the override action of the cylinder override means 51. When the variable displacement pump in transmission 54 reaches its maximum displacement rightward motion of arm 52 ceases and rod 50 is pushed inwardly of cylinder 51 against the enclosed resilient means to allow further travel of pedal 10 for increasing engine speed. Release of pedal 10 back to its neutral position causes the swash plate of the transmission to be returned to its neutral displacement position while slowing of engine speed to the idle condition, illustrated by the positioning of the links in FIG. 5, occurs as a result of the biasing of control rod 32. A similar analysis may be made for operation in a reverse direction as illustrated in FIG. 6.

While the above invention has been described by means of specific embodiments thereof it is to be understood that numerous changes and modifications may be made therein without departing from the spirit and scope of the invention as defined in the appended claims.

The embodiments of the invention in which an exclusive property or privilege is claimed are defined as follows:

1. A linkage assembly comprising:
a frame member;
a pivot shaft mounted relative said frame;
an operator responsive pedal member mounted on said pivot shaft and rotatable thereabout in a pivoting motion from a neutral position in first and second directions;
first link means connected with said pedal for translating pivoted motion of said pedal to rotational motion;
a control rod reciprocally mounted relative said frame and movable in third and fourth directions;
bias means for biasing said control rod in said fourth direction;
second link means operably connecting said pedal member with said control rod for causing said control rod to move only in said third direction while said pedal member is rotated from its neutral position in said first and said second direction;
said second link means comprising a first arm affixed to and rotatable with said pivot shaft, a second arm coupled with said first arm and extending at generally right angles therefrom, an elongated lever mounted generally at its midpoint for rotation on said frame with said second arm coupled at one end of said lever, first and second lost motion links coupled with said lever each on opposite sides of the mounting thereof and extending outwardly in the same general direction; and, coupling means for associating said lost motion links with said control rod.

2. The linkage assembly of claimm 1 wherein the coupling means for associating the lost motion links with the control rod comprises a plate member having one end thereof affixed to the frame for pendular motion, a common pin affixing the pair of lost motion links to the other end of said plate member and a control rod pin affixing the control rod to said plate member.

3. The linkage assembly of claim 2 further comprising balancing means for opposing the biasing means of the control rod, by providing force increasing in proportion to rotational travel of the pedal from the neutral position.

4. The linkage assembly of claim 3 further comprising adjustable stop means for limiting pendular motion of the plate member.

5. The linkage assembly of claim 4 further comprising pedal stop means for limiting rotation of said pedal in a first direction.

6. In combination with a framed vehicle having an internal combustion engine driving a hydrostatic transmission with a variable displacement pump, and including an engine governor for controlling engine speed;
  a linkage assembly comprising:
  a pivot shaft mounted relative the vehicle frame;
  an operator responsive pedal member mounted on said pivot shaft and rotatable thereabout in a pivoting motion from a neutral position in first and second directions;
  a shaft rotatably mounted relative said vehicle frame for operatively controlling displacement of the variable displacement pump;
  first link means connecting said pedal with said shaft for translating pivoted motion of said pedal to rotational motion in said shaft;
  a control rod reciprocally mounted relative said frame and movable in third and fourth directions for controlling the engine governor;
  bias means for biasing said control rod in said fourth direction;
  second link means operably connecting said pedal member with said control rod for causing said control rod to move only in said third direction while said pedal member is rotated from its neutral position in said first and said second direction;
  said second link means comprising a first arm affixed to and rotatable with said pivot shaft, a second arm coupled with said first arm and extending at generally right angles therefrom, an elongated lever mounted generally at its midpoint for rotation on said frame with said second arm coupled at one end of said lever, first and second lost motion links coupled with said lever each on opposite sides of the mounting thereof and extending outwardly of the same general direction, and coupling means for associating said lost motion links with said control rod.

7. The linkage assembly of claim 6 wherein the coupling means for associating the lost motion links with the control rod comprises a plate member having one end thereof affixed to the frame for pendular motion, a common pin affixing the pair of lost motion links to the other end of said plate member and a control rod pin affixing the control rod to said plate member.

8. The linkage assembly of claim 7 further comprising balancing means for opposing the biasing means of the control rod, by providing force increasing in proportion to rotational travel of the pedal from the neutral position.

* * * * *